United States Patent [19]
Lee

[11] Patent Number: 4,607,375
[45] Date of Patent: Aug. 19, 1986

[54] COVERT COMMUNICATION SYSTEM
[75] Inventor: William C. Lee, Denville, N.J.
[73] Assignee: ITT Corporation, New York, N.Y.
[21] Appl. No.: 661,745
[22] Filed: Oct. 17, 1984
[51] Int. Cl.[4] ............................................. H04L 9/00
[52] U.S. Cl. ................................... 375/2.2; 375/1.0; 455/27; 178/22.15
[58] Field of Search ......................... 375/1.0, 2.2, 2.1; 455/29, 27; 178/22.15

[56] References Cited
U.S. PATENT DOCUMENTS

| | | | |
|---|---|---|---|
| 4,231,113 | 10/1980 | Blasbalg | 375/2.2 |
| 4,400,790 | 8/1983 | Chambers et al. | 375/1.0 |
| 4,477,912 | 10/1984 | Russell | 375/1.0 |

Primary Examiner—Salvatore Cangialosi
Assistant Examiner—Aaron J. Lewis
Attorney, Agent, or Firm—John T. O'Halloran; Thomas F. Meagher

[57] ABSTRACT

The covert communication system comprises a first arrangement to translate binary "1" bits into different portions of a predetermined PN (pseudonoise) code sequence and primary "0" bits into a complement of the different portion of the PN sequences, the PN sequence being selected to spread the binary signal over as large a bandwidth as possible. A second arrangement is coupled to the first arrangement to transmit the portions of the PN sequence and the complements of the portions of the PN sequence at a variable transmission rate and at a power level below environmental noise of propagation medium. A third arrangement is coupled to the second arrangement through the propagation medium to receive the portions of the PN sequence and the complements of the portions of the PN sequence imbedded the environmental noise with a fourth arrangement coupled to the third arrangement to recover the binary signal from the received portions of the PN sequence and the received complements of the portions of the PN sequence. To render the communication system more covert, the second arrangement includes the Rayleigh fader producing a waveform simulating a Rayleigh fading characteristic with the waveform being modulated by the portions of the PN sequences and the complements of the portions of the PN sequences only during time periods the waveform is above a predetermined amplitude.

29 Claims, 9 Drawing Figures

Fig. 7 ns/page

COVERT COMMUNICATION SYSTEM

BACKGROUND OF THE INVENTION

The present invention relates to communication systems and more particularly to a covert communication system.

The term "covert communication system" means a communication system that prevents unauthorized detection of the communication traffic. Basically, it is desired to employ an extensive bandwidth to improve a signal to noise ratio. The use of wide bandwidth to enhance signal to noise ration is not new. Frequency modulation was first used in 1936 to enhance the signal to noise ratio level against man-made noise environment. Many systems in the past, such as the pulsed FM system and spread spectrum systems, have used wide bandwidth with significant power reduction for both radar and communication transmission.

The military and any other agency or commercial endeavor that requires confidential transmission of data require low probability of intercept, low probability of exploiting and low probability of jamming.

SUMMARY OF THE INVENTION

An object of the present invention is to provide a communication system having low probability of intercept, a low probability of exploiting and a low probability of jamming.

Another object of the present invention is to provide a communication system that employs book codes for frequency hopping to spread the intelligence over a very wide bandwidth, employs low power and employs Rayleigh faders at both ends of the transmission system with variable transmission speed so as to enhance the covertness of the communication system.

A feature of the present invention is the provision of a covert communication system comprising: first means coupled to a binary information signal having at least a given bit rate to translate binary one bits into a different portion of a predetermined PN (psuedonoise) code sequence and binary zero bits into a complement of the different portions of the PN sequence, said PN sequence being selected to spread the binary signal over as large a bandwidth as possible; second means coupled to the first means to transmit the portions of the PN sequences and the complements of the portions of the PN sequence at a power level below environmental noise of a propagation medium; third means coupled to the second means through the propagation medium to receive the portions of the PN sequence and the complements of the portions of the PN sequence embedded in the environmental noise; and fourth means coupled to the third means to recover the binary signal from the received portions of the PN sequence and the received complements of the portions of the PN sequence.

Another feature of the present invention is the provision of a second means including a first memory having a constant write rate and a variable read rate coupled to the first means, modulator means coupled to a read output of the first memory, and a first Rayleigh fader coupled to the first memory and the modulator means, the first fader producing a waveform simulating a Rayleigh fading characteristic, the waveform being modulated in the modulator means by the portions of the PN sequences and the complements of the portions of the PN sequence only during time periods the waveform is above a predetermined amplitude, the waveform controlling the first memory to read therefrom the portions of the PN sequences and the complements of the portions of the PN sequence during the time periods.

Still a further feature of the present invention is the provision of the third means including demodulator means coupled to a wideband filter, a second memory having a variable write rate and a constant read rate, and a second Rayleigh fader coupled to the second memory and the demodulator means, the second fader producing the waveform, the waveform recovering in the demodulator means the portions of the PN sequences and the complements of the portions of the PN sequences during the time period, the waveform controlling the second memory to write therein the portions of the PN sequences and the complements of the portions of the PN sequence during the time periods.

Still another feature of the present invention is the provision of the second means further including a first mixer coupled to the modulator means, a first frequency synthesizer coupled to the first mixer, and a first frequency decision circuit coupled to the first frequency synthesizer responsive to the PN sequence to control the frequency output of the first frequency synthesizer to thereby provide a frequency hopping carrier frequency for the transmitted portions of the PN sequence and the transmitted complements of the portions of the PN sequences.

A further feature of the present invention is the provision of cross correlator means included in the fourth means, said cross correlator means including a PN code generator providing the PN sequence and the complement of the PN sequence, a pair of shift registers coupled to the second memory to store the received portions of the PN sequences and the received complement of the portions of the PN sequences, a third shift register coupled to the PN generator to store portions of the PN sequence therein, a fourth shift register coupled to the second PN generator to store portions of the complement of the PN sequence therein, first coincident gate means coupled to each stage of one of the pair of shift registers and each stage of the third shift register to detect coincident bits in associated stages of the one of the pair of shift registers and the third shift register, first adding means coupled to the first coincident gate means to add output signals of the first coincident gate means, second coincident gate means coupled to each stage of the other of the pair of shift registers and each stage of the fourth shift register to detect coincident bits in associated stages of the other of the pair shift registers and the fourth shift register; and second adding means coupled to the second coincident gate means to add output signals of the second coincident gate means.

Still a further feature of the present invention is the provision of a covert communications transmitter comprising first means coupled to a binary information signal having at least a given bit rate to translate binary one bits into different protions of a predetermined PN (psuedonoise) code sequence and binary zero bit into a complement of the different portions of the PN sequence, the PN sequence being selected to spread the binary signal over as large a bandwidth as possible; and second means coupled to the first means to transmit the protions of th PN sequence and the complements of portions of the PN squence at a power level below environmental noise of a propagation medium.

Another further feature of the present invention is the provision of a covert communication receiver comprising first means coupled to a propagation medium to receive portions of a PN (psuedonoise) code sequence and complements of the portions of the PN sequence embedded in environmental noise of the propagation medium, each of the portions of the PN sequence representing a binary one bit of a binary information signal having at least a given bit rate and each of the complements of the portions of the PN sequence representing a binary zero bit of the binary signal; and second means coupled to the first means to recover the binary signal from the received portions of the PN sequence and the received complements of the portions of the PN sequence.

BRIEF DESCRIPTION OF THE DRAWING

Above-mentioned and other features and objects of this invention will be become more apparent by reference to the following description taken in conjunction with the accompanying drawing, in which.

DESCRIPTION OF THE PREFERRED EMBODIMENTS

The covert communication system disclosed herein uses the principle of spread spectrum, but the practical implementation is different from a typical spread spectrum system. First, the bandwidth of the covert communication system occupies an extensively wide bandwidth so that no single receiver and antenna structure can intercept it. Secondly, the received signal is very weak, imbedded in environmental noise, so that a special arrangement would be required to detect it. To properly utilze the spectrum, the bandwidth/power tradeoff is such that bandwidth will not be wasted. From the Shannon capacity formula $$R = B \log_2 (1 + S/N) \quad (1)$$

where R is the maximal transmission rate, B is the bandwidth and S/N is the carrier-to-noise ratio.

The signal-to-noise ratio per information bit, $E_b/N_0$ can be expressed as $$\frac{E_b}{N_o} = \frac{S}{N} \times \frac{B}{R} \quad (2)$$

Substituting equation (2) into equation (1), it can be shown that $$\frac{E_b}{N_o} = 10 \log_{10} \left[ \frac{B}{R} (2^{R/B} - 1) \right] \quad (3)$$

$$= 10 \log_{10} \left[ \frac{B}{R} \left( 1 + \frac{R}{B} \ln 2 + \frac{1}{2!} \left( \frac{R}{B} \ln 2 \right)^2 + \ldots - 1 \right) \right]$$

$$= -1.6 \text{ db as } B/R \to \infty$$

The limits exist and the convergence is monotonic. Below this value of −1.6 dB (decibel), there can be no error-free performance, even if B is arbitrarily large or if R is vanishingly small. In fact, the real system operates well above −1.6 dB. In the present system we are trying to operate the level above −1.6 dB but not near it. Under the situation of near −1.6 dB, to achieve a good performance is likely to be expensive. We try to utilize the bandwidth as wide as possible in designing a system so that the expensive system is the expense of using bandwidth. However, since the transmitting signal can be very weak, the same bandwidth can be used for other channels without interference. The cross-correlation properties against interference will be considered later.

In principle, $$\frac{S}{N} = \frac{R}{B} \cdot \frac{E_b}{N_o} = \frac{R}{B} \ln 2 \text{ for } \frac{B}{R} \to \infty \quad (4)$$

In principle, as long as the $E_b/N_0$ is greater than −1.6 dB, S/N can be transmitted as low as possible. The relationship between R and B can be determined as follows when the carrier-to-noise ratio at the receiver is $$\left. \begin{array}{c} \frac{S}{N} = -50 \text{ dB} \\ \text{and} \\ E_b/N_o > \ln 2 \end{array} \right\} \quad (5)$$

then $$\frac{B}{R} \geq \frac{E_b}{N_o} \Big/ \frac{S}{N} = \frac{\ln 2}{S/N} = \frac{0.693}{10^{-5}} = 6.93 \times 10^4 \quad (6)$$

or $$B \geq 6.93 \times 10^4 \cdot R$$

If the transmission rate is R=200 bps (bits per second), then the minimum bandwidth is $1.38 \times 10^7$ Hz (hertz) based on the conditions of equation (6). If R equals 2.4 Kbps (kilobits per second), then B is equal to 166 MHz (megahertz), the minimum bandwidth. If a line-of-sight link is provided, the path loss is $r^{-2}$, where r is the distance between the transmitter and the receiver. Then if r is 10 miles and the received RF (radio frequency) level is $10^{-15}$ mw (milliwatts) (−150 dBm) at 1 GHz (gigahertz), the transmitter power only needs to be −33 dBm (0.0005 mw). It is assumed that the environmental noise level is −100 dBm and S/N is equal to −50 dB to provide the signal level of −150 dBm. Bear in mind, in a real situation, tnat the bandwidth needs to be wider in order to make the transmission link workable.

Figure 1:
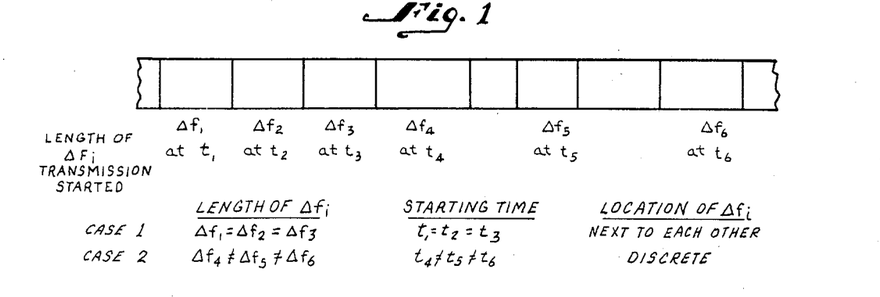
FIG. 1 is an illustration of the utilization of the frequency spectrum in accordance with the principles of the present invention.

In the system of the instant application, either frequency division multiplex or frequency division and time division multiplex, with a wide range of bandwidth, can be used to transmit a message. The utilization of the spectum is shown in FIG. 1. FIG. 1 shows two possible arrangements or utilization of the spectrum. The transmission of $\Delta f_i$, $i = 1 \ldots n$, can be either frequency division multiplex or a combination of frequency division and time division multiplex. As indicated, the spectrum of $\Delta f_i$ can continuously appear in a portion of the spectrum or can be discrete and separated from each other. Also, all $\Delta f_i$ can have the same lengths of bandwidths or different lengths of bandwidths.

In accordance with the principles of the present invention, each information bit is represented by a section of a PN (pseudonoise) sequence generated by a PN code generator.

The PN generator can have a long-term repetitive cycle. In the system described, linear codes can be employed for bandwidth spreading and cannot be detected by an unauthorized user. Therefore, the use of non-linear codes for low probability of intercept or for securing a transmission system is not necessary provided the linear code is long enough. The requirements for a code for a covert communication are interference rejection and spread spectrum application, so the linear codes are suitable. Maximum length codes (often called m-sequences) can be used. These codes are the longest codes which can be generated by a given shift register. The maximum length sequence is $2^n - 1$ bits, where n is the number of stages in the shift register. The code sequence length L for a one-year repetitive cycle and the design of a shift register for R=200 bps and a S/N=−50 dB is shown as follows. The bit rate of a spread spectrum (PN) code can be obtained from equation (6). Let the information rate be 200 bps, the rate $R_{ss}$ of a PN spread spectrum code for BPSK (binary phase shift keying) modulation is from equation (6) $R_{ss} = B/2 \simeq 6.9 \times 10^6$ bps provided that the conditions of equation (5) hold. The one-year code length is $L = 365 \times 24 \times 3600 \times (6.9 \times 10^6) \simeq 2.17 \times 10^{14}$ bits/one year.

The number of stages n in the shift register can be determined by $$L = 2^n - 1 \qquad (7)$$

or $$n = \log_2(L + 1) = \frac{\log_{10}(L + 1)}{\log_{10} 2} = \frac{14 + .338}{.3} \simeq 48 \qquad (8)$$

The required speed of a shift register $$R_{ss} = 6.9 \times 10^6 \text{ bps} - \frac{1}{t_R + \sum_1^\rho \tau_i} \qquad (9)$$

where $t_R$ = time for a shift register stage to reach its next state.

$C_R = 1/t_R$ = clock rate
$t_i$ = propagation time through the feedback network at each tap.
$\rho$ = number taps $$t_k = t_R + \sum_1^\rho t_i = \text{period of the clock pulse as required.}$$

Let $\rho = 4$, and $\sum_1^\rho t_i \gg t_R$, then $\sum_1^\rho t_i - \frac{1}{R_{ss}} = 1.45 \times 10^{-7}$ Roughly, calculate the average $t_i$ as $\rho = 4$ $$\bar{t}_i = \frac{\sum_1^4 t_i}{4} = 3.623 \times 10^{-8}$$

The total time propagating through the shift register is roughly $$\tau_t = 2 \times t_i = 7.246 \times 10^{-8} \text{ sec.}$$

The time of $t_R$ can be obtained by $$t_R = \tau_t / 48 = 1.5096 \times 10^{-9} \text{ sec.}$$

The clock rate then can be determined as $$C_R = 1/t_R = 6.624 \times 10^8 \text{ Hz}$$

Since charge coupled devices can operate up to 1 GHz, the clock rate calculated above is feasible. Therefore, the covert communication system for R=200 bps and S/N=−50 dB can be realized by a single spread spectrum receiver at a carrier frequency of 1 GHz. However, a covert communication system for R=2.4 Kbps and S/N=−50 dB is hard to design as a single spread spectrum receiver at the same 1 GHz carrier frequency, because of the wide bandwidth of 166 MHz that is required. Several SS receivers are needed to implement this embodiment and will be described hereinbelow with respect to FIGS. 8 and 9.

The advantage of a cross-correlation function will now be described. The purpose of using Gold codes is that the aperiodic cross-correlation for Gold sequences is known to be statistically as low as possible for sequences of a given length. However, when the code length becomes large, two cross-correlation bounds $$|\rho(\tau)|_{gold} \leq \frac{(\sqrt{2} \cdot \sqrt{1 + 1/L} + 1/\sqrt{2})^{\frac{1}{2}}}{\sqrt{L}} \xrightarrow{L \to \infty} \frac{\sqrt{2}}{\sqrt{L}} \qquad (10)$$

$$|\rho(\tau)|_{m \; seq.} \leq \frac{(1 + 1/L - (1/L)^2)^{\frac{1}{2}}}{\sqrt{L}} \xrightarrow{L \to \infty} \frac{1}{\sqrt{L}} \qquad (11)$$

show that the Gold code exhibit cross-correlation which is $\sqrt{2}$ greater than m sequence codes when L is very large.

Figure 2:
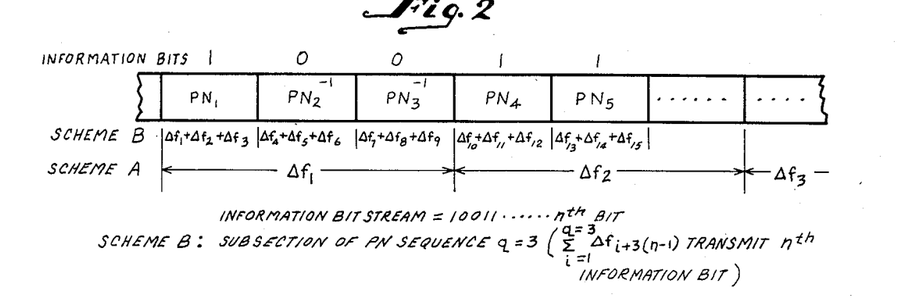
FIG. 2 is an illustration of two transmission arrangements.

As shown in FIG. 2, the PN sequence can be divided into N sections or portions and each section or portion represents one information bit. Assume that a BPSK modulation waveform is used to distinguish "1" and "0" bits of a PN sequence. The bit sequences of all PN$_i$ sections represent logic "1" of an information bit and the complement of tnese PN sections represent a logic "0" of the information bit. Thus, each section PN$_i$ of a long PN sequence represents an information bit. PN$_i^{-1}$ indicates the complement of a PN section or portion. For instance, PN$_2^{-1}$ is the complement of the PN$_2$ section or portion of the PN sequence as shown in FIG. 2. A long PN sequence with a PN bit rate of $R_{ss} = 6.9$ MBS (megabits per second) can be transmitted by a single spread spectrum system. It has been shown that the concealed message at 200 BPS can be received at a signal-to-noise ratio equal to −50 dB. In many situations, a PN bit rate may be very high and cannot be utilized in a single spread spectrum system. Then each $PN_i$ section is further divided into subsections $(PN_i)_j$ and each subsection is carried by one of q frequency bands $f_i$. $PN_i = (PN_i)_1 + (PN_i)_2 + (PN_i)_3 + \ldots + (PN_i)_q$. The number q means that there are q spread sprectrum systems required. The q can be a large number if it is necessary to be used against strong jammers. The transmission mechanism for q=3 on each information bit is denoted as scheme B and shown in FIG. 2. Scheme A of FIG. 2 shows that the first three binary bits are translated to 3 PN code sections or portions and these three PN portions of the PN sequence are transmitted at a first carrier frequency and the next three PN portions of the PN sequences are transmitted at a second carrier frequency. These frequencies are random in nature and are provided by a frequency hopping technique.

Figure 3:
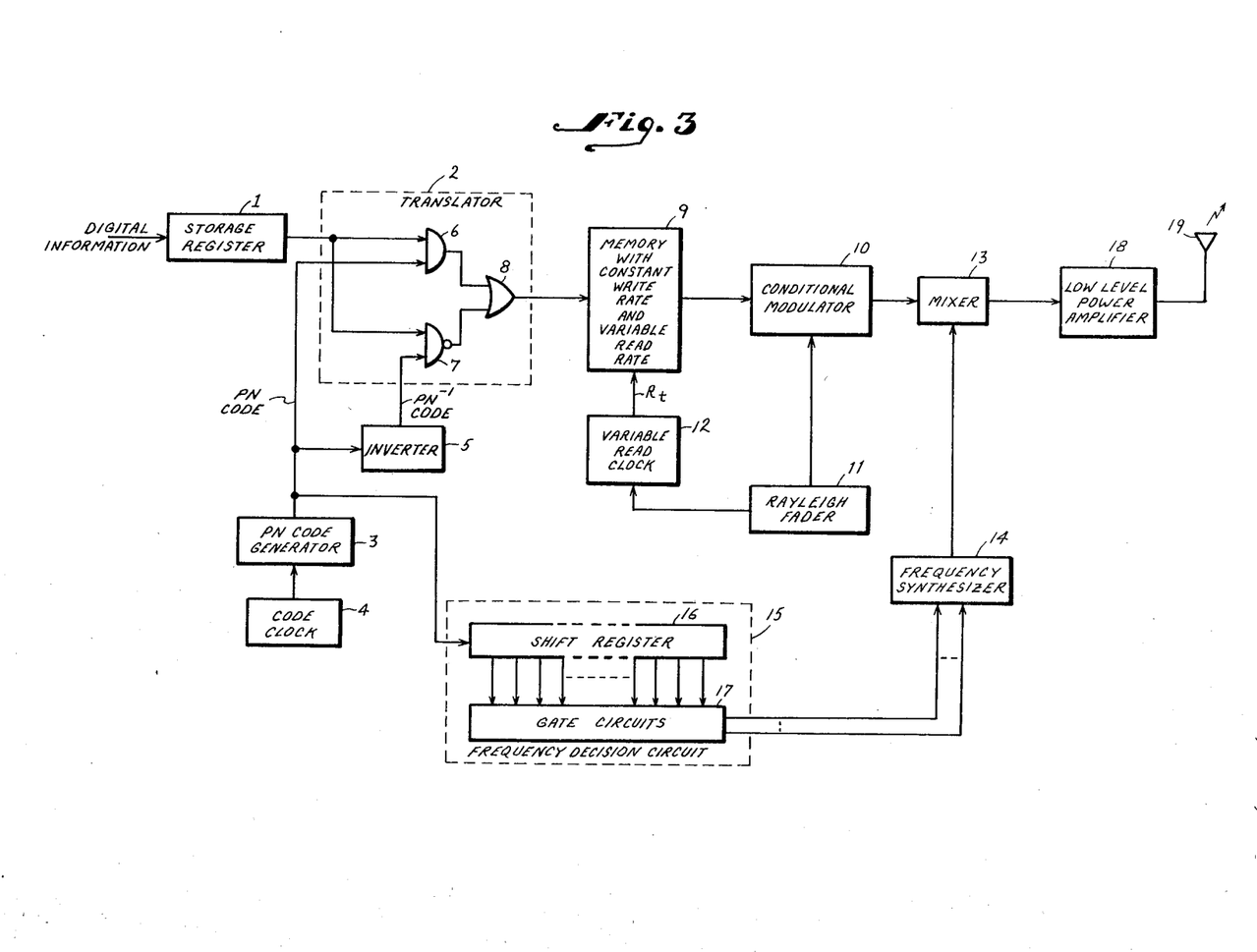
FIG. 3 is a block diagram of the transmitter of the covert communication system in accordance with the principles of the present invention.

Referring to FIG. 3, there is illustrated in block diagram form a transmitter of the covert communication system in accordance with the principles of the present invention. The digital information is coupled to a storage register 1 to act as a buffer. The digital information in storage register 1 is coupled to a translator 2 so that each information bit is translated to a portion of a PN sequence or the complement of a portion of the PN sequence depending upon whether the information bit is a "1" or a "0". For purposes of illustration, the PN sequence is provided by a PN code generator 3 whose rate is controlled by the code clock 4. The PN sequence is coupled directly to translator 2 and through an inverter 5 to translator 2 to provide the complement of the PN sequence. As an example, the translator 2 may include a AND gate 6 to pass a portion of the PN code sequence for each "1" information bit and a NAND gate 7 to pass a complement of a portion of the PN code sequence in response to each "0" information bit. The output of gates 6 and 7 are passed to the output of translator 2 by an OR gate 8.

Figure 4:
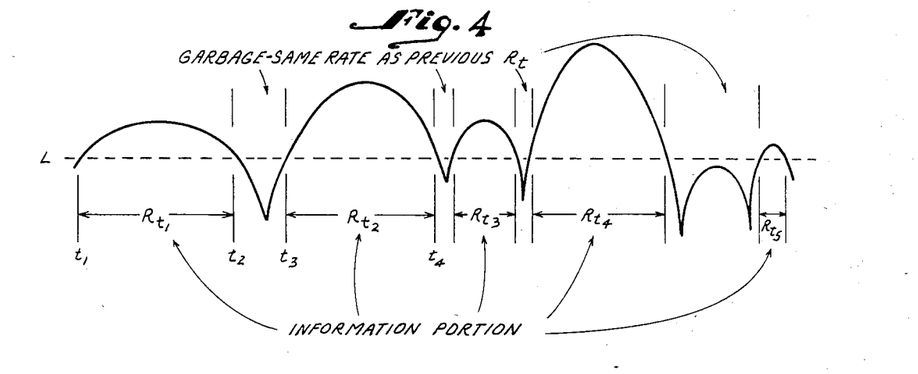
FIG. 4 is a waveform provided by the Rayleigh fader of FIGS. 3 and 5.

The output of translator 2 is coupled to a memory 9 having a constant write rate and a variable read rate. Variable output of memory 9 is coupled to a conditional modulator 10 which receives an input from Rayleigh fader 11 which provides a waveform having a Rayleigh fading characteristic such as shown in FIG. 4. The conditional modulator 10 establishes a threshold or amplitude level L and the portions of the PN sequence and the complements of the portions of the PN sequence from memory 9 are modulated onto the Rayleigh waveform during those time periods when the Rayleigh waveform is above amplitude L. The time periods between $t_1$ and $t_2$ and between $t_3$ and $t_4$ are the only time periods in which the Rayleigh waveform is modulated and it is these time periods that are examined at the distance receiver without any regard to the amplitude of the simulated Rayleigh characteristic. Due to the fact that the time periods during which the Rayleigh waveform is modulated is variable, the reading of the memory 9 likewise is variable and is controlled by the waverform of Rayleigh fader 11 by adjusting the read clock 12 so that the portions of the PN sequence and the complement of the portions of the PN sequence are read out of memory 9 only when the waveform of the Rayleigh fader 11 is above level L. The output of modulator 10 is coupled to a mixer 13 which has coupled thereto a frequency signal from frequency synthesizer 14 providing the carrier frequency for the signal being transmitted.

To further enhance the covertness of the covert communication system of the present application, the carrier frequency can be randomly hopped under control of the PN sequence from generator 3. The PN sequence is coupled from generator 3 to a frequency decision circuit 15 which, for example, may include a shift register 16 having taps at each of the stages thereof, or at least selected stages thereof, with these taps being coupled to gate circuits 17 to detect desired combinations of "1"s and "0"s of the PN sequence to determine the frequency that the frequency synthesizer 14 will be operating at. Due to the random nature of the PN sequence, the frequency of synthesizer 14 coupled to mixer 13 will also be random in nature and thereby provide increased covertness. The output of mixer 13 is coupled to a low-level power amplifier 18 to transmit the signal at the output of mixer 13 from antenna 19 at a lever so that at the receiver the transmitted signal is embedded in the environmental noise of the propagation medium.

Figure 5:
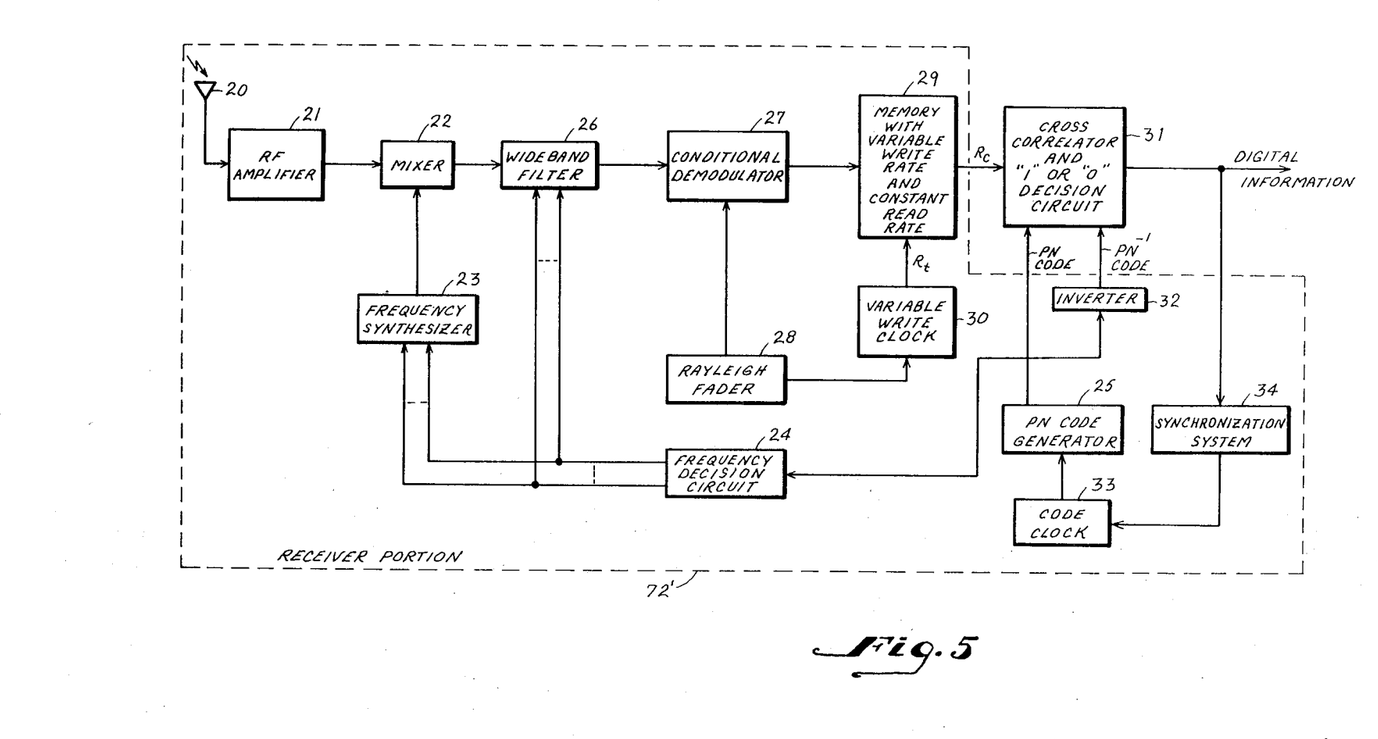
FIG. 5 is a block diagram of a receiver for the covert communication system in accordance with the principles of the present invention.

Referring to FIG. 5, there is illustrated therein a block diagram of the receiver of the covert communication system in accordance with the principles of the present invention.

The signal transmitted from the transmitter of FIG. 3 is received on antenna 20 of the receiver embedded in the environmental noise of the propagation medium. The signal received on antenna 20 is coupled to an RF amplifier 21 and, hence, to a mixer 22 which has coupled thereto a frequency signal from frequency synthesizer 23 whose frequency output is under control of a frequency decision circuit 24 identical to the frequency decision circuit 15 of the transmitter of FIG. 3 which demodulates predetermined bits of the PN sequence produced by PN code generator 25 which is identical to the PN sequence produced by code generator 3 of the transmitter of FIG. 3. Through the cooperation of synthesizer 23 and mixer 22, the received signal is defrequency hopped with the output of mixer 22 being coupled to to a wideband filter 26 whose frequency response is controlled by frequency decision circuit 24. A conditional demodulator 27 is coupled to the output of wideband filter 26 and has coupled to the other input thereof Rayleigh fader 28 which is identical to Rayleigh fader 11 of the transmitter of FIG. 3. Rayleigh fader 11 provides the same Rayleigh fading characteristic waveform as fader 11 so that demonstrator 27 can operate during the same time periods that the simulated Rayleigh fading characteristic waveform and the transmitter was modulated with the portions of the PN sequence and complements of the portions of the PN sequence to extact from the received signal the same portions of the PN sequence and the sme complements of the portions of the PN sequence. The output of demodulator 27 is coupled to memory 29 having a variable write rate and a constant read rate, with the write rate of the memory 29 being controlled by Rayleigh fader 28 through the variable write clock 30. The variable write rate of memory 29 is required since, as it will be recalled, the transmission rate of the portions of the PN sequence and the complements of the portions of the PN sequence were variable at the transmitter due to the modulation of the Rayleigh waveform in the modulator 10 only during those protions of the Rayleigh waveform which were above the amplitude level L.

The output of memory 29 is coupled to a cross-correlator and "1" or "0" decision circuit 31 to enable extraction of the information from the portions of the PN sequences and the complements of the portions of PN sequences. Cross-correlator and decision circuit 31 have coupled thereto the PN sequence from code generator 24 and the complement of tne PN sequence provided by inverter 32 coupled to generator 25.

The cross-correlator compares the received portions of the PN sequences with the locally generated PN code and complement of the PN code to determine when a portion of the PN sequence and a complement of the potion of the PN sequence is received and the decision circuit outputs an information "1" bit when the portion of the PN sequence is detected in the cross-correlator and a "0" information bit when the cross-correlator detects the presence of a complement of a portion of the PN sequence. Thus, the digital information coupled to storage register 1 at the transmitter of FIG. 3 is provided at the output of cross-correlator and decision circuit 31.

There is a necessity for synchronization between generator 3 and generator 25. This can be accomplished on a time of day basis, namely, setting the clocks 4 and 33 to the same rate and phase once a day or as many times a day as is necessary. This is sufficient to achieve the synchronization if the clocks 4 and 33 are very accurate clocks. To fine tune the synchronization, it would be possible to send a synchronizing signal through the communication system momentarily prior to employing the covert techniques disclosed herein so that the timing and phasing of clock 33 could be slippped to produce the desired synchronization. This is illustrated in FIG. 5 by the synchronization system 34 coupled to the output of cross-correlator and decision circuit 31.

As is known, without Rayleigh faders there is a slight chance of intercepting a PN code signal by squaring and detecting it. The purpose of using the two Rayleigh faders and variable transmission rates disclosed in the instant application is to confuse unauthorized receivers from recognizing our signal and yet does not degrade the performance of reception.

Although the system illustrated in FIGS. 3 and 5 does not require rigid system timing as mentioned above it is obviously necessary for the receiver to synchronize their PN sequences to the incoming signals. The PN code phase uncertainty has to be resolved within one chip duration before despreading of the received signal can result. A sliding correlator synchronizer for initial acquisition can be used and has been disclosed in the publication of R. C. Dixon entitled "Spread Spectrum Techniques", IEEE Press, New York 1976. Additionally, a delay-lock tracking loop can also be employed for tracking the information bits.

Figure 6:
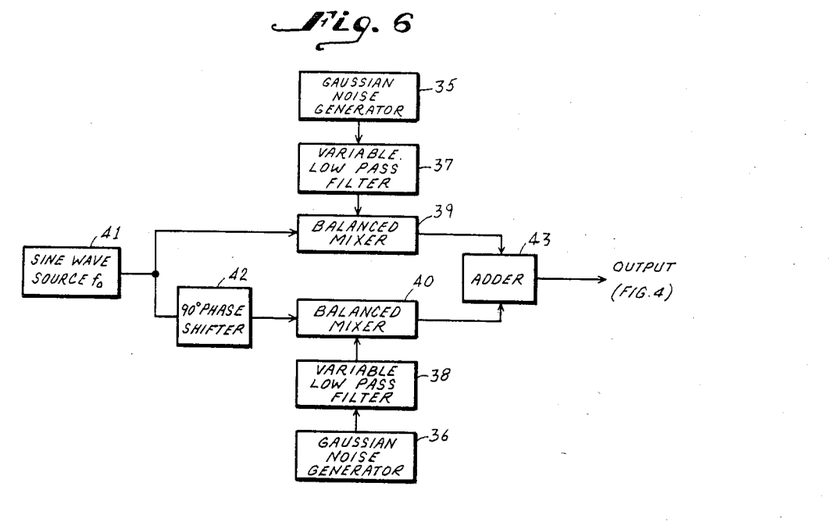
FIG. 6 is a block diagram of the Rayleigh fader employed in both FIGS. 3 and 5.

FIG. 6 illustrates a block diagram of a Rayleigh fader that can be used for the fader 11 of FIG. 3 and fader 28 of FIG. 5. The Rayleigh fader includes two Gaussian noise generators 35 and 36 coupled respectively to variable low pass filters 37 and 38 whose outputs are coupled respectively to balanced mixers 39 and 40. The other input of balanced mixer 39 is coupled to a sine wave source 41 and the other input of balanced mixer 40 is coupled to the source 41 through a 90° phase shifter 42. The output of balanced mixers 39 and 40 are coupled to an adder 43 to provide a waveform having a Rayleigh fading characteristic as shown in FIG. 4. Details of this Rayleigh fader can be obtained by referring to the book authored by the applicant entitled "Mobile Communications Engineering" at pages 228–231.

Figure 7:
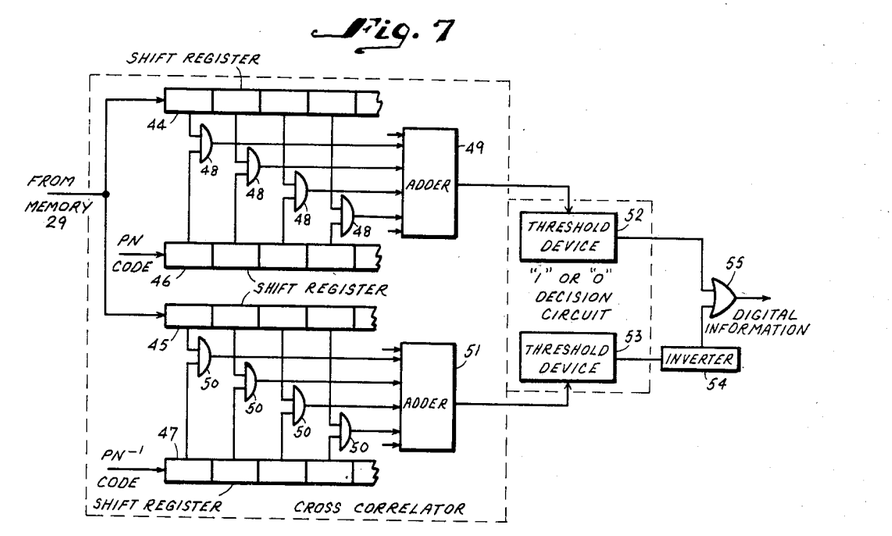
FIG. 7 is a block diagram of the cross correlator and decision circuit of FIG. 5.

One example of the cross-correlator and decision circuit 31 of FIG. 5 is shown in block diagram form in FIG. 7. Portions of the PN sequence and the complements of the portions of the PN sequences are coupled to shift registers 44 and 45. The PN sequence is coupled to shift register 46 and the complement of the PN sequence is coupled to shift register 47. AND gates 48 are coupled to corresponding stages of shift registers 44 and 46 to detect coincidences in the bits stored in each stage of these two shift registers. When the portion of the PN sequence is present in shift register 44 in time coincidence with the PN sequence in shift register 46, the maximum output will be present at the output of adder 49.

AND gates 50 are coupled to corresponding stages of shift registers 45 and 47 to detect the time coincidence of the received complement portions of the code sequence and the complement of the PN sequence. Adder 51 provides a maximum output when there is a time coincidence between all of the bits of the received complements of the portions of the PN sequence and the complement of the PN sequence locally generated. The output of adder 49 is coupled to a threshold device 52 and will produce an output therefrom if the output of adder 49 is above a predetermined amplitude level which would be adjusted so that only an output will be produced if all of the AND gates 48 provide an output so that adder 49 produces a maximum output. Similarly, a threshold device 53 is coupled to the output of adder 51 having a threshold level so that only when all of the gates 50 respond and adder 51 provides a maximum output will threshold device 53 provide an output. The output from threshold device 53 is coupled to an inverter 54 so that a logic "0" is produced which in the transmitter produced the complement of the portions of the PN sequence. The output of threshold 52 which will be a logic "1" and the output of inverter 54 which will be a logic "0" will be coupled through OR gate 55 to provide the digital information tnat was originally coupled to storage register 1.

For the case where R=2.4 Kbps and S/N= −50 dB, the transmission bandwidth requirements obtained from equation (6) is $B = 6.93 \times 10^4 \cdot R = 166$ MHz. The bandwidth of 166 MHz is too wide to be transmitted on 2 GHz carrier or any lower carrier frequency. One embodiment to enable transmission of such a wide band of frequency is illustrated in block diagram form in FIG. 8. The 166 MHz bandwidth is divided into eight 20.7 MHz sub-bands using eight carrier frquencies, namely, 200 MHz, 400 MHz, 600 MHz, 800 MHz, 1 GHz, 1.2 GHz, 1.4 GHz and 1.6 GHz to carry these eight sub-bands, one for each carrier. The implementation of such an arrangement actually consists of eight single spread spectrum or convert communication systems as disclosed with respect to FIGS. 3 and 5 where the eight transmitters have the configuration illustrated in FIG. 3 and the receiver portions 64–71 are identical to the receiver protion 72' of FIG. 5. The 2.4 KBS bit stream is divided into eight sections with each section being coupled to a different one of the transmitters 56–63.

The PN sequence bit rate for each covert communication system with BPSK modulation is 10.3 Mbps where the total PN sequence bit rate is $PN = 8 \, PN_i = 83$ MBPS. Since the $PN_i$ bit rate in this case is very close to the rate of 6.9 MHz for the case of R=200 BPS, the shift register should have approximately 48 stage, and the clock rate of the shift register is around 1 GHz for each covert transmission system.

The transmitting power values have to be different for different communication systems based on their carrier frequencies. For a distance of ten miles, the transmitter requirement is listed for each system. The transmitting power for 1.6 GHz = −30 dBm
1.4 GHz = −31 dBm
1.2 GHZ = −32 dBm
1 GHZ = −33 dBm
800 MHz = −35 dBm
600 MHz = −38 dBm
400 MHz = −41 dBm
200 MHz = −47 dBm where the noise floor is assumed to be −100 dBm and S/N = −50 dB. Tne number of PN bits per one information bit is $$\frac{R_{ss}}{R} = \left(\frac{166 \text{ Mbps}}{2}\right) / 2.4 \text{ kbps} = 3.4 \times 10^4 \text{ bits/1 inf. bit}$$

There are two schemes of sending the PN sequences with can be applied to the covert communication system. The first scheme is that illustrated in FIG. 8 where each of the eight communication system receives 300 information bits with the outputs of the cross-correlators 72-79 are coupled to the decision circuits 80-87 and, hence, to a combiner 88 to recover the original 2.4 KBS bit stream.

Figure 8:
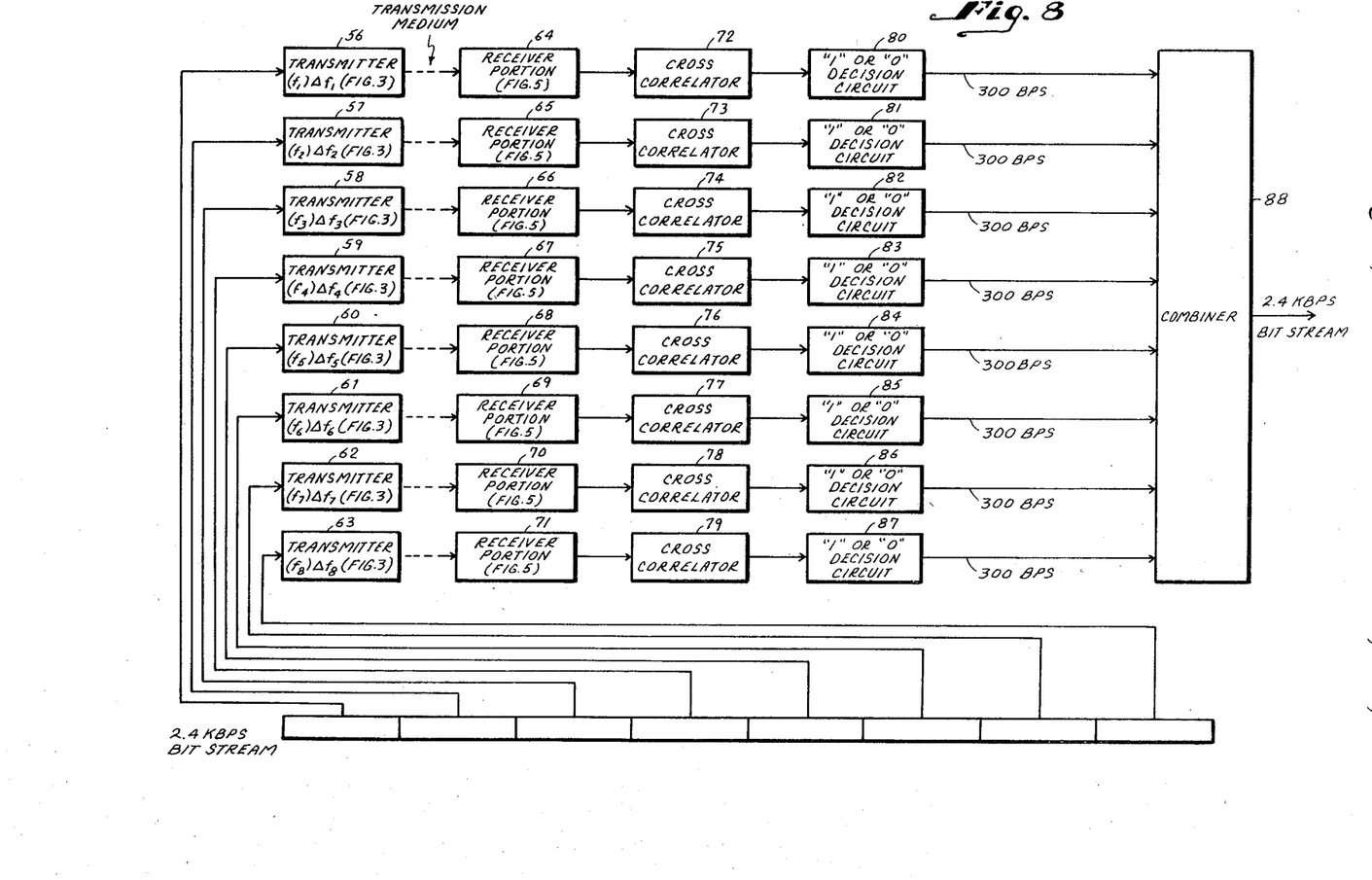
FIG. 8 is a block diagram of another embodiment of the covert communication system in accordance with the principles of the present invention.
Figure 9:
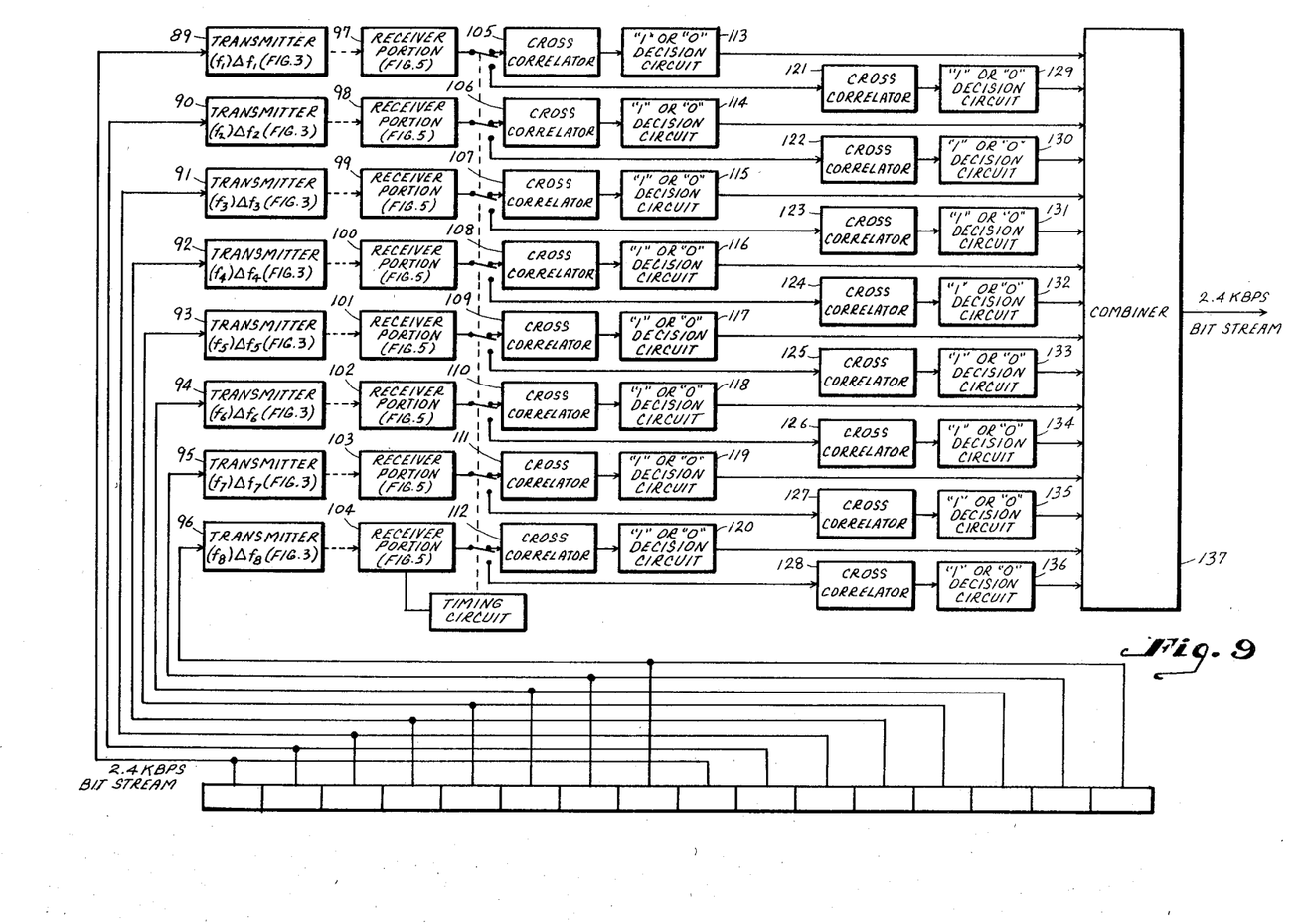
FIG. 9 is still another embodiment of the covert communication system in accordance with the principles of the present invention.

The second arrangement is shown in FIG. 9 and again employs eight distinct communication systems operating as in FIG. 8 on separate carrier frequencies. In this arrangment the 2.4 KBS bit stream is divided into half and each half is divided into eight portions with the corresponding portions of the two halves being coupled in time sequence to different ones of the transmitters 89-96. The reciver portions 97-104 (each like receiver portion 72 of FIG. 5) receive the transmitted information from their associated transmitters with the outputs of these receiver portions being switchable between two arrangements of cross-correlators and decision circuits. For instance, cross-correlators 105-112 and decision circuits 113-120 would be receiving the portions of the PN sequence and the complements of the portions of the PN sequence for one half of the 2.4 Kbps bit stream. The cross-correlators 121-128 and the decision circuits 129-136 would be receiving the portions of the PN sequence and the complements of the portions of the PN sequence for the other half of the 2.4 Kbps bit stream, while the cross-correlators 105-112 and the decision circuits 113-120 were deciding whether an information "1" or an information "0" has been received. In other words, when one group of cross-correlator and decision circuits is being loaded, the other group of cross-correlators and decision circuits are providing a "1" or a "0" output. The outputs of the decision circuits 113-120 and 129-136 are coupled to a combiner 137 to provide the 2.4 Kbps bit stream coupled originally to the transmitters 89-96.

The covert communication system obviously would defeat or at least reduce to a very minimum the capability of an unauthorized receiver from intercepting our communication. An intercepting system must always achieve the three basic functions of detection, frequency estimation and direction finding. The detection function is the most difficult task among all of the three functions. Under the assumption that the distance between our transmitter and our receiver is shorter than from our transmitter and the unauthorized intercepting receiver, the unauthorized receiver will receive our RF signal lower than S/N = −50 dB. This weak signal is contributed by the spread of the signal energy. At this level, the code length is one year long and no other signal signature is used. Therefore, the intercept receiver cannot detect our signal and will treat our signal as a noise. For the situation where the unauthorize receiver is placed shorter than our receiver, the distortion generated by the Rayliegh fader with variable rates confuses the unauthorized receiver by making the unauthorized receiver believe that our signal is noise.

The advantages of our system is the use of a "book code" which requires the unauthorized receiver to know what page and line our code word has been obtained from, a low power signal and a noise-like signal to conceal our communication. Therefore, since an the unauthorized receiver cannot detect our signal, no unauthorized interception can attack our transmission link.

While I have described above the principles of my invention in connection with specific apparatus, it is to be clearly understood that this description is made only by way of example and not as a limitation to the scope of my invention as set forth in the objects thereof and in the accompanying claims.

I claim:

1. A covert communication system comprising:

first means coupled to a binary information signal having at least a given bit rate to translate binary one bits into different portions of a predetermined PN (pseudonoise) code sequence and binary zero bits into a complement of said different portions of said PN sequence, said PN sequence being selected to spread said binary signal over as large a bandwidth as possible;

second means coupled to said first means to transmit said portions of said PN sequence and said complements of said portions of said PN sequence at a power level below environmental noise of a propagation medium;

third means coupled to said second means through said propagation medium to receive said portions of said PN sequence and said complements of said portions of said PN sequence embedded in said environmental noise; and fourth means coupled to said third means to recover said binary signal from said received portions of said PN sequence and said received complements of said portions of said PN sequence, wherein said fourth means includes cross correlator means coupled to said third means to detect said received portions of said PN sequences and said received complements of said portions of said PN sequence, and decision means coupled to said cross correlator means to provide a binary one output when said portions of said PN sequences are detected and a binary zero output when said complements of said portions of said PN sequence are detected, and wherein said cross correlator means includes a PN code generator providing said PN sequence and said complement of said PN sequence, a pair of shift registers coupled to said third means to store said received portions of said PN sequence and said received complement of said portions of said PN sequences, a third shift register coupled to said PN generator to store portions of said PN sequence therein, a fourth shift register coupled to said PN generator to store portions of said complement of said PN sequence therein, first coincident gate means coupled to each stage of one of said pair of shift registers and each stage of said third shift register to detect coincident bits in associated stages of said one of said pair of shift registers and said third shift register, first adding means coupled to said first coincident gate means to add output signals of said first coincident gate means, second coincident gate means coupled to each stage of the other of said pair of shift registers and each stage of said fourth shift register to detect coincident bits in associated stages of said other of said pair of shift registers and said fourth shift register; and second adding means coupled to said second coincident gate means to add output signals of said second coincident gate means.

2. A system according to claim 1, wherein said decision means includes a first amplitude threshold means coupled to said first adding means responsive to the output therefrom to produce a binary one when a first amplitude threshold is exceeded, and a second amplitude threshold means coupled to said second adding means responsive to the output therefrom to produce a binary zero when a second amplitude threshold level is exceeded.

3. A system according to claim 1, wherein said cross correlator means includes a second PN code generator providing said PN sequence and said complement of said PN sequence, a pair of shift registers coupled to said wideband filter to store said received portions of said PN sequence and said received complement of said portions of said PN sequences, a third shift register coupled to said second PN generator to store portions of said PN sequence therein, a fourth shift register coupled to said second PN generator to store portions of said complement of said PN sequence therein, first coincident gate means coupled to each stage of one of said pair of shift registers and each stage of said third shift register to detect coincident bits in associated stages of said one of said pair of shift registers and said third shift register, first adding means coupled to said first coincident gate means to add output signals of said first coincident gate means, second coincident gate means coupled to each stage of the other of said pair of shift registers and each stage of said fourth shift register to detect coincident bits in associated stages of said other of said pair of shift registers and said fourth shift register; and second adding means coupled to said second coincident gate means to add output signals of said second coincident gate means.

4. A system according to claim 3, wherein said decision means includes a first amplitude threshold means coupled to said first adding means responsive to the output therefrom to produce a binary one when a first amplitude threshold level is exceeded, and a second amplitude threshold means coupled to said second adding means responsive to the output therefrom to produce a binary zero when a second amplitude threshold level is execeeded.

5. A system according to claim 1, wherein said cross correlator means includes a PN code generator providing said PN sequence and said complement of said PN sequence, a pair of shift registers coupled to said wideband filter to store said received portions of said PN sequence and said received complement of said portions of said PN sequences, a third shift register coupled to said PN generator to store portions of said PN sequence therein, a fourth shift register coupled to said PN generator to store portions of said complement of said PN sequence therein, first coincident gate means coupled to each stage of one of said pair of shift registers and each stage of said third shift register to detect coincident bits in associated stages of said one of said pair of shift registers and said third shift register, first adding means coupled to said first coincident gate means to add output signals of said first coincident gate means, second coincident gate means coupled to each stage of the other of said pair of shift registers and each stage of said fourth shift register to detect coincident bits in associated stages of said other of said pair of shift registers and said fourth shift register; and second adding means coupled to said second coincident gate means to add output signals of said second coincident gate means.

6. A system according to clam 5, wherein said decision means includes a first amplitude threshold means coupled to said first adding means responsive to the output therefrom to produce a binary one when a just amplitude threshold level is exceeded, and a second amplitude threshold means coupled to said second adding means responsive to the output therefrom to produce a binary zero when a second amplitude threshold level is execeeded.

7. A system according to claim 1, wherein said cross correlator means includes a PN code generator providing said PN sequence and said complement of said PN sequence, a pair of shift registers coupled to said wideband filter to store said received portions of said PN sequence and said received complement of said portions of said PN sequences, a third shift register coupled to said PN generator to store portions of said PN sequence therein, a fourth shift register coupled to said PN generator to store portions of said complement of said PN sequence therein, first coincident gate means coupled to each stage of one of said pair of shift registers and each stage of said third shift register to detect coincident bits in associated stages of said one of said pair of shift registers and said third shift register, first adding means coupled to said first coincident gate means to add output signals of said first coincident gate means, second coincident gate means coupled to each stage of the other of said pair of shift registers and each stage of said fourth shift register to detect coincident bits in associated stages of said other of said pair of shift registers and said fourth shift register; and second adding means coupled to said second coincident gate means to add output signals of said second coincident gate means.

8. A system according to claim 7, wherein said decision means includes a first amplitude threshold means coupled to said first adding means responsive to the output therefrom to produce a binary one when a first amplitude threshold level is exceeded, and a second ampliltude threshold means coupled to said second adding means responsive to the output therefrom to produce a binary zero when a second amplitude threshold level is execeeded.

9. A covert communication system comprising:

first means coupled to a binary information signal having at least a given bit rate to translate binary one bits into different portions of a predetermined PN (pseudonoise) code sequence and binary zero bits into a complement of said different portions of said PN sequence, said PN sequence being selected to spread said binary signal over as large a bindwidth as possible;

second means coupled to said first means to transmit said portions of said PN sequence and said complements of said portions of said PN sequence at a power level below environmental noise of a propagation medium;

third means coupled to said second means through said propagation medium to receive said portions of said PN sequence and said complements of said portions of said PN sequence embedded in said environmental noise; and fourth means coupled to said third means to recover said binary signal from said received portions of said PN sequence and said received complements of said portions of said PN sequence, wherein said first means includes a first PN code generator providing said PN sequence, and logic gate means coupled to said first PN generator and said binary signal responsive to said binary bits to provide said portions of said PN sequence and said complements of said portions of said PN sequences, wherein said second means includes a first memory having a constant write rate and a variable read rate coupled to said logic gate means, modulator means coupled to a read output of said first memory, and a first Rayleigh fader coupled to said first memory and said modulator means, said first fader producing a waveform simulating a Rayleigh fading characteristic, said waveform being modulated in said modulator means by said portions of said PN sequences and said complements of said portions of said PN sequences only during time periods said waveform is above a predetermined amplitude, said waveform controlling said first memory to read therefrom said portions of said PN sequences and said complements of said portions of said PN sequences during said time periods, wherein said third means includes a radio frequency amplifier and wideband filter to receive said portions of said PN sequence and said complements of said portions of said PN sequence embedded in said environmental noise, and wherein said third means further includea demodulator means coupled to said wideband filter, a second memory having a variable write rate and a constant read rate, and a second Rayleigh fader coupled to said second memory and said demodulator means, said second fader producing said waveform, said waveform recovering in said demodulator means said portions of said PN sequences and said complements of said portions of said PN sequences during said time periods, said waveform controlling said second memory to write therein said received portions of said PN sequences and said received complements of said portions of said PN sequence during said time periods.

10. A system according to claim 9, wherein said fourth means includes cross correlator means coupled to said second memory to detect said received portions of said PN sequences and said received complements of said portions of said PN sequence, and decision means coupled to said cross correlator means to provide a binary one output when said portions of said PN sequences are detected and a binary zero output when said complements of said portions of said PN sequence are detected, and wherein said cross correlator means includes a second PN code generator providing said PN sequence and said complement of said PN sequence, a pair of shift registers coupled to said second memory to store said received portions of said PN sequence and said received complement of said portions of said PN sequences, a third shift register coupled to said second PN generator to store portions of said PN sequence therein, a fourth shift register coupled to said second PN generator to store portions of said complement of said PN sequence therein, first coincident gate means coupled to each stage of one of said pair of shift registers and each stage of said third shift register to detect coincident bits in associated stages of said one of said pair of shift registers and said third shift register, first adding means coupled to said first coincident gate means to add output signals of said first coincident gate means, second coincident gate means coupled to each stage of the other of said pair of shift registers and each stage of said fourth shift register to detect coincident bits in associated stages of said other of said pair of shift registers and said fourth shift register; and second adding means coupled to said second coincident gate means to add output signals of said second coincident gate means.

11. A system according to claim 10, wherein said decision means includes a first amplitude threshold means coupled to said first adding means responsive to the output therefrom to produce a binary one when a first amplitude threshold level is exceeded, and a second ampliltude threshold means coupled to said second adding means responsive to the output therefrom to produce a binary zero when a second amplitude threshold level is execeeded.

12. A system according to claim 9, wherein said second means further includes
   a first mixer coupled to said modulator means,
   a first frequency synthesizer coupled to said first mixer, and
   a first frequency decision circuit coupled to said first frequency synthesizer responsive to said PN sequence to control the frequency output of said first frequency synthesizer to thereby provide a frequency hopping carrier frequency for said transmitted portions of said PN sequence and said transmitted complements of said portions of said PN sequence.

13. A system according to claim 12, wherein said third means further includes
   a second mixer coupled between said propagation medium and said wideband filter,
   a second frequency synthesizer coupled to said second mixer, and
   a second frequency decision circuit coupled to said second frequency synthesizer and said wideband filter responsive to said PN sequence to control the frequency response of said wideband filter and the frequency of said second frequency synthesizer to recover said frequency hopped transmitted portions of said PN sequence and said frequency hopped transmitted complements of said portions of said PN sequences.

14. A covert communication system comprising:
   first means coupled to a binary information signal having at least a given bit rate to translate binary one bits into different portions of a predetermined PN (pseudonoise) code sequence and binary zero bits into a complement of said different portions of said PN sequence, said PN sequence being selected to spread said binary signal over as large a bandwidth as possible;
   second means coupled to said first means to transmit said portions of said PN sequence and said complements of said portions of said PN sequence at a power level below environmental noise of a propagation medium;
   third means coupled to said second means through said propagation medium to receive said portions of said PN sequence and said complements of said portions of said PN sequence embedded in said environmental noise; and
   fourth means coupled to said third means to recover said binary signal from said received portions of said PN sequence and said received complements of said portions of said PN sequence, wherein said second means includes
   a first memory having a constant write rate and a variable read rate coupled to said first means,
   modulator means coupled to a read output of said first memory, and
   a first Rayleigh fader coupled to said first memory and said modulator means, said first fader producing a waveform simulating a Rayleigh fading characteristic, said waveform being modulated in said modulator means by said portions of said PN sequences and said complements of said portions of said PN sequences only during time periods said waveform is above a predetermined amplitude, said waveform controlling said first memory to read therefrom said portions of said PN sequences and said complements of said portions of said PN sequences during said time periods.

15. A system according to claim 14, wherein said third means includes
   a radio frequency amplifier and wideband filter to receive said portions of said PN sequence and said complements of said portions of said PN sequence embedded in said environmental noise,
   demodulator means coupled to said wideband filter,
   a second memory having a variable write rate and a constant read rate, and
   a second Rayleigh fader coupled to said second memory and said demodulator means, said second fader producing said waveform, said waveform recovering in said demodulator means said portions of said PN sequences and said complements of said portions of said PN sequences during said time periods, said waveform controlling said second memory to write therein said received portions of said PN sequences and said received complements of said portions of said PN sequence during said time periods.

16. A system according to claim 15, wherein said fourth means includes
   cross correlator means coupled to said second memory to detect said received portions of said PN sequences and said received complements of said portions of said PN sequence, and
   decision means coupled to said cross correlator means to provide a binary one output when said portions of said PN sequences are detected and a binary zero output when said complements of said portions of said PN sequence are detected, and wherein said cross correlator means includes
   a PN code generator providing said PN sequence and said complement of said PN sequence,
   a pair of shift registers coupled to said second memory to store said received portions of said PN sequence and said received complement of said portions of said PN sequences,
   a third shift register coupled to said PN generator to store portions of said PN sequence therein,
   a fourth shift register coupled to said PN generator to store portions of said complement of said PN sequence therein,
   first coincident gate means coupled to each stage of one of said pair of shift registers and each stage of said third shift register to detect coincident bits in associated stages of said one of said pair of shift registers and said third shift register,
   first adding means coupled to said first coincident gate means to add output signals of said first coincident gate means,
   second coincident gate means coupled to each stage of the other of said pair of shift registers and each stage of said fourth shift register to detect coincident bits in associated stages of said other of said pair of shift registers and said fourth shift register; and
   second adding means coupled to said second coincident gate means to add output signals of said second coincident gate means.

17. A system according to claim 15, wherein said second means further includes
   a first mixer coupled to said modulator means,
   a first frequency synthesizer coupled to said first mixer, and a first frequency decision circuit coupled to said first frequency synthesizer responsive to said PN sequence to control the frequency output of said first frequency synthesizer to thereby provide a frequency hopping carrier frequency for said transmitted portions of said PN sequence and said transmitted complements of said portions of said PN sequence.

18. A system according to claim 17, wherein said third means further includes
a second mixer coupled between said propagation medium and said wideband filter,
a second frequency synthesizer coupled to said second mixer, and
a second frequency decision circuit coupled to said second frequency synthesizer and said wideband filter responsive to said PN sequence to control the frequency response of said wideband filter and the frequency output of said second frequency synthesizer to recover said frequency hopped transmitted portions of said PN sequence and said frequency hopped transmitted complements of said portions of said PN sequence.

19. A system according to claim 18, wherein said fourth means includes
cross correlator means coupled to said second memory to detect said received portions of said PN sequences and said received complements of said portions of said PN sequence, and
decision means coupled to said cross correlator means to provide a binary one output when said portions of said PN sequences are detected and a binary zero output when said complements of said portions of said PN sequence are detected, and wherein said cross correlator means includes
a PN code generator providing said PN sequence and said complement of said PN sequence,
a pair of shift registers coupled to said second memory to store said received portions of said PN sequence and said received complement of said portions of said PN sequences,
a third shift register coupled to said PN generator to store portions of said PN sequence therein,
a fourth shift register coupled to said PN generator to store portions of said complement of said PN sequence therein,
first coincident gate means coupled to each stage of one of said pair of shift registers and each stage of said third shift register to detect coincident bits in associated stages of said one of said pair of shift registers and said third shift register,
first adding means coupled to said first coincident gate means to add output signals of said first coincident gate means,
second coincident gate means coupled to each stage of the other of said pair of shift registers and each stage of said fourth shift register to detect coincident bits in associated stages of said other of said pair of shift registers and said fourth shift register; and
second adding means coupled to said second coincident gate means to add output signals of said second coincident gate means.

20. A system according to claim 14, wherein
said binary information signal has a bit rate equal to N times said given bit rate, each frame of said information signal being divided into N time periods,
said first, second, third and fourth means are provided N times each operating on information signals in a different one of said N time periods, and
combiner means coupled to each of said N fourth means to combine said information signals of said N time periods into said information signal.

21. A system according to claim 14, wherein
said binary information signal has a bit rate equal to N times said given bit rate, each frame of said information signal being divided in half with each half being divided into N time periods,
said first, second and third means being provided N times each operating on information signals in different corresponding ones of said N time periods in each half of said frame in time sequence,
said fourth means being provided N times to operate on signals in a different one of said N time periods in one half of said frame and N additional times to operate on signals in a different one of said N time periods in the other half of said frame, and
combiner means coupled to each of said 2N fourth means to combine said information signals of said 2N time periods into said information signal.

22. A covert communication transmitter comprising:
first means coupled to a binary information signal having at least a given bit rate to translate binary one bits into different portions of a predetermined PN (pseudonoise) code sequence and binary zero bits into a complement of said different portions of said PN sequence, said PN sequence being selected to spread said binary signal over as large a bandwidth as possible; and
second means coupled to said first means to transmit said portions of said PN sequence and said complements of said portions of said PN sequence at a power level below environmental noise of a propagation medium, wherein said first means includes
a PN code genergtor providing said PN sequences, and logic gate means coupled to said PN generator and said binary signal responsive to said binary bits to provide said portions of said PN sequence and said complements of said portions of said PN sequences, and wherein said second means includes
a mixer coupled to said first means,
a frequency synthesizer coupled to said mixer, and
a frequency decision circuit coupled to said frequency synthesizer responsive to said PN sequence to control the frequency output of said frequency synthesizer to thereby provide a frequency hopping carrier frequency for said transmitted portions of said PN sequence and said transmitted complements of said portions of said PN sequence.

23. A transmitter according to claim 22, wherein
said binary information signal has a bit rate equal to N times said given bit rate, each frame of said information signal being divided into N time periods, and
said first and second means are provided N times each operating on information signals in a different one of said N time periods.

24. A transmitter according to claim 22, wherein
said binary information signal has a bit rate equal to N times said given bit rate, each frame of said information signal being divided into N time periods, and
said first and second means are provided N times each operating on information signals in different corresponding ones of said N time periods in each half of said frame in time sequence.

25. A covert communication receiver comprising first means coupled to a propagation medium to receive portions of a PN (pseudonoise) code sequence and complements of said portions of said PN sequence embedded in environmental noise of said propagation medium, each of said portions of said PN sequence representing a binary one bit of a binary information signal having at least a given bit rate and each of said complements of said portions of said PN sequence representing a binary zero bit of said binary signal; and second means coupled to said first means to recover said binary signal from said received portions of said PN sequence and said received complements of said portions of said PN sequence, wherein said second means includes cross correlator means coupled to said first means to detect said received portions of said PN sequences and said received complements of said portions of said PN sequence, and decision means coupled to said cross correlator means to provide a binary one output when said portions of said PN sequences are detected and a binary zero output when said complements of said portions of said PN sequence are detected, and wherein said cross correlator means includes a PN code generator providing said PN sequence and said complement of said PN sequence, a pair of shift registers coupled to said first means to store said received portions of said PN sequence and said received complement of said portions of said PN sequences, a third shift register coupled to said PN generator to store portions of said PN sequence therein, a fourth shift register coupled to said PN generator to store portions of said complement of said PN sequence therein, first coincident gate means coupled to each stage of one of said pair of shift registers and each stage of said third shift register to detect coincident bits in associated stages of said one of said pair of shift registers and said third shift register, first adding means coupled to said first coincident gate means to add output signals of said first coincident gate means, second coincident gate means coupled to each stage of the other of said pair of shift registers and each stage of said fourth shift register to detect coincident bits in associated stages of said other of said pair of shift registers and said fourth shift register; and second adding means coupled to said second coincident gate means to add output signals of said second coincident gate means.

26. A receiver according to claim 25, wherein said binary information signal has a bit rate equal to N times said given bit rate, each frame of said information signal being divided into N time periods, said first and second means are provided N times each operating on signals in a different one of said N time periods, and combiner means coupled to each of said N second means to combine said information signals of said N time periods into said information signal.

27. A receiver according to claim 25, wherein said binary information signal has a bit rate equal to N times said given bit rate, each frame of said infomation signal being divided in half with each half being divided into N time periods, said first means being provided N times each operating on information signals in different corresponding ones of said N time periods in each half of said frame in time sequence, said second means being provided N time to operate on signals in a different one of said N time periods in one half of said frame and N additional times to operate on signals in a different one of said N time periods in the other half of said frame, and combiner means coupled to each of said 2N second means to combine said information signals of said 2N time periods into said information signal.

28. A covert communication receiver comprising first means coupled to a propagation medium to receive portions of a PN (pseudonoise) code sequence and complements of said portions of said PN sequences embedded in environmental noise of said propagation medium, each of said portions of said PN sequence representing a binary one bit of a binary information signal having at least a given bit rate and each of said complements of said portions of said PN sequence representing a binary zero bit of said binary signal; and second means coupled to said first means to recover said binary signal from said received portions of said PN sequence and said received complements of said portions of said PN sequence, and wherein said received portions of said PN sequence and said received complements of said portions of said PN sequence are modulated on a waveform simulating a Rayleigh fading characteristic only during time periods thereof which were above a given amplitude at a distant transmitter, and said first means includes demodulator means coupled to said propagation medium, a memory having a variable write rate and a constant read rate, and a Rayleigh fader coupled to said memory and said demodulator means, said fader producing said waveform, said waveform recovering in said demodulator means said received portions of said PN sequence and said received complements of said portions of said PN sequence during said time periods, said waveform controlling said memory to write therein said received portions of said PN sequence and said received complements of said portions of said PN sequence during said time periods.

29. A receiver according to claim 28, wherein said received portions of said PN sequence and said received complements of said portions of said PN sequence further have their carrier frequency hopped in a random manner determined by said PN sequence at said distant transmitter, and said first means further includes a mixer coupled between said propagation medium and said demodulator means, a frequency synthesizer coupled to said mixer, and a frequency decision circuit coupled to said frequency synthesizer responsive to said PN sequence to control the frequency of said frequency synthesizer to recover said frequency hopped portions of said PN sequence and said frequency hopped complements of said portions of said PN sequence.

* * * * *